United States Patent
Ishikawa

[11] Patent Number: 5,947,066
[45] Date of Patent: Sep. 7, 1999

[54] TWO-CYCLE INTERNAL COMBUSTION ENGINE

[75] Inventor: Takeshi Ishikawa, Tokyo, Japan

[73] Assignee: Kioritz Corporation, Tokyo, Japan

[21] Appl. No.: 08/975,288

[22] Filed: Nov. 20, 1997

[30] Foreign Application Priority Data

Nov. 22, 1996 [JP] Japan .................................... 8-312383

[51] Int. Cl.⁶ ............................ F02B 17/00; F02B 25/04; F02B 63/02
[52] U.S. Cl. ........................................ 123/65 P; 123/73 B
[58] Field of Search ............................ 123/65 P, 65 PE, 123/65 A, 73 PP, 73 B, 73 C

[56] References Cited

U.S. PATENT DOCUMENTS

| | | |
|---|---|---|
| 4,258,670 | 3/1981 | Thery ..................................... 123/73 B |
| 4,458,636 | 7/1984 | Kania ..................................... 123/65 P |
| 4,779,581 | 10/1988 | Maier . |
| 4,876,999 | 10/1989 | Schierling et al. . |
| 5,237,966 | 8/1993 | Katoh et al. .......................... 123/73 B |
| 5,471,960 | 12/1995 | Nagao et al. . |
| 5,671,703 | 9/1997 | Otome et al. .......................... 123/65 P |
| 5,857,449 | 1/1999 | Ishikawa et al. ..................... 123/73 B |

Primary Examiner—Marguerite McMahon
Attorney, Agent, or Firm—Baker & Botts, L.L.P.

[57] ABSTRACT

A two-cycle internal combustion engine comprising a combustion chamber, an exhaust port and a scavenging port each opening into the combustion chamber. The opening area of each of the exhaust port and the scavenging port is made as small as possible in relation to the engine displacement so as to restrict the revolutions of the engine crank shaft during a rated output operation of the engine. The width in the lateral direction of the opening of the exhaust port corresponds to an angle of 60° as measured from the center of the combustion chamber, and the width in the lateral direction of the opening of the scavenging port corresponds to an angle of 32° as measured from the center of the combustion chamber.

2 Claims, 4 Drawing Sheets

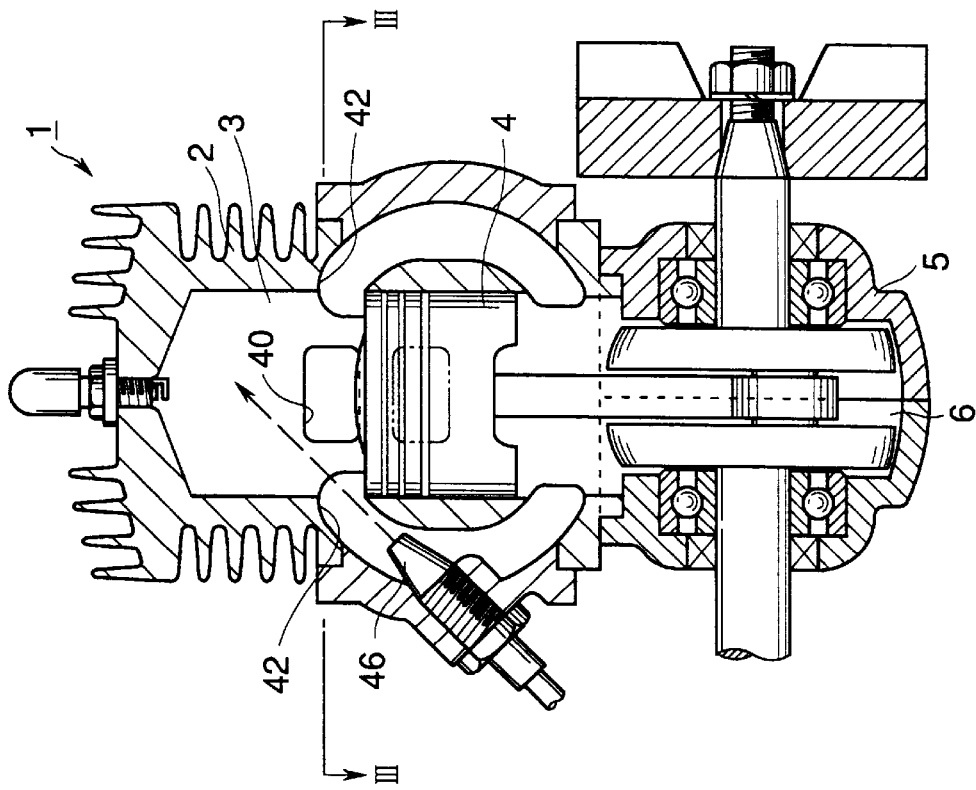
FIG.2A [THE PRESENT INVENTION]
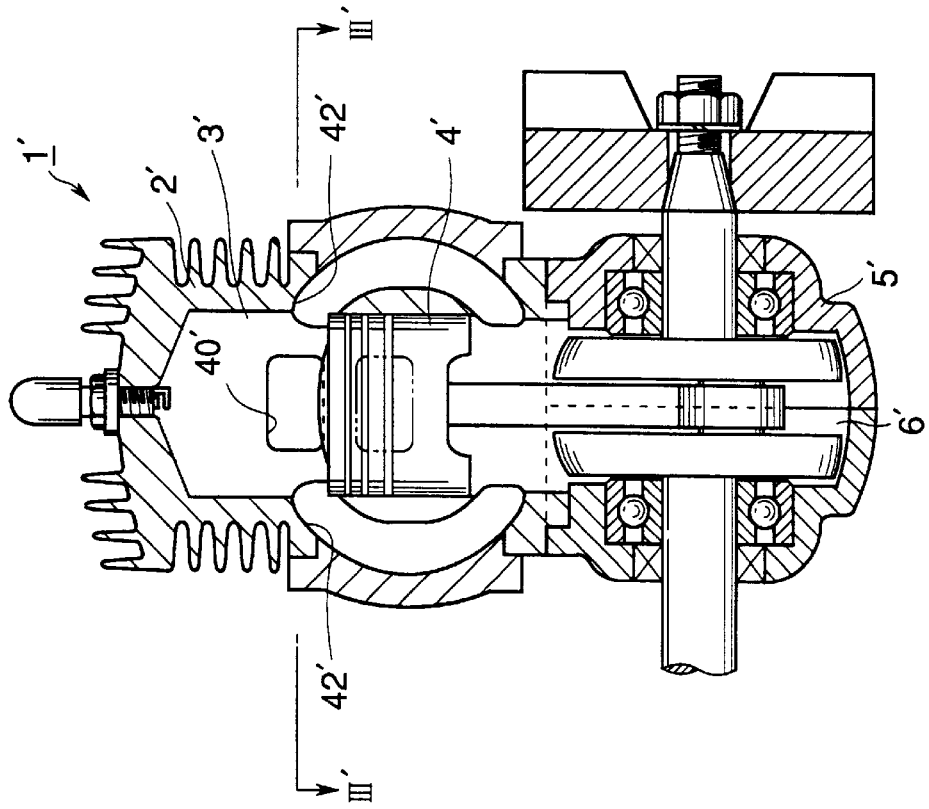
FIG.2B [PRIOR ART]

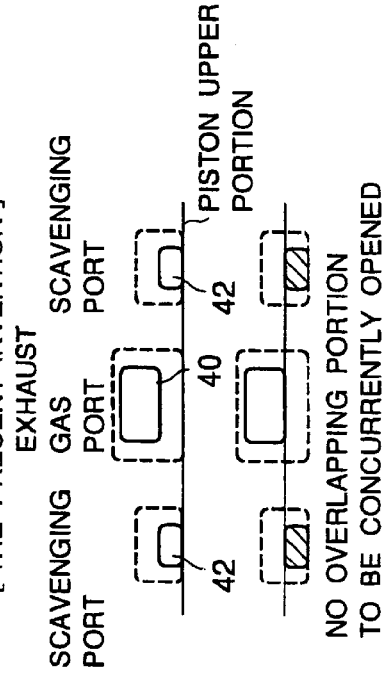
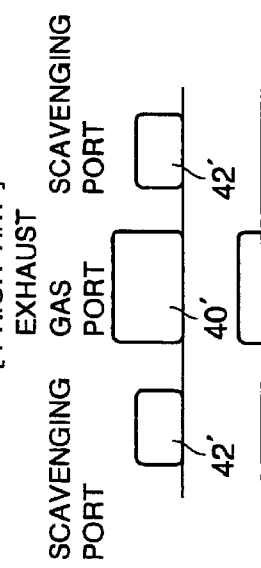
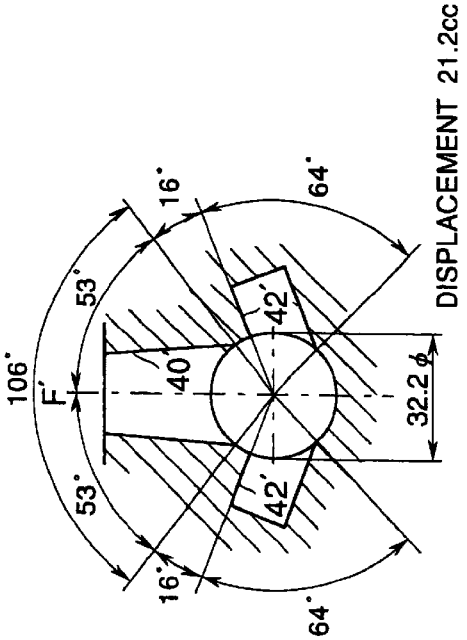

TWO-CYCLE INTERNAL COMBUSTION ENGINE

BACKGROUND OF THE INVENTION

1. Field of the Invention

The present invention relates to a two-cycle internal combustion engine, and in particular to a two-cycle internal combustion engine of the fuel injection type, which is relatively small in size and suited for use in a portable working machine such as a chain saw or a bush cutter.

2. The Prior Art

The two-cycle internal combustion engine of relatively small size (for example, total displacement: 21.2 cc; cylinder bore: 32.2 mm; and piston stroke: 26 mm), which is now employed in a portable working machine such as a chain saw or a bush cutter is generally constructed as illustrated in FIG. 4. Namely, the two-cycle internal combustion engine 1' shown in FIG. 4 includes a cylinder portion 2' having a cylindrical inner wall in which a piston 4' is movably inserted, a head portion 7' provided with a so-called squish dome-shaped combustion chamber 3' and formed integrally with the cylinder portion 2', a plurality of air-cooling fins 8' formed around the outer peripheral portions of the cylinder portion 2' and the head portion 7', and a split type crankcase 5' attached to the lower end portion of the cylinder portion 2' and provided therein with a crank chamber 6'.

The inner peripheral wall of the cylinder portion 2' is provided with a suction port 41' and an exhaust port 40', both facing towards each other and being offset vertically from each other. The inner peripheral wall of the cylinder portion 2' is also provided with a pair of scavenging ports 42', 42' facing towards each other in a direction perpendicular to the facing direction of the ports 40' and 41', thereby forming a two-cycle internal combustion engine of the so-called Schnuerle type.

In order to facilitate the monoblock casting of the cylinder portion 2' and the head portion 7' by means of a high pressure die casting, a pair of openings-for-casting 44', 44' are formed respectively along scavenging passages 43', 43' communicating with each of the scavenging ports 42', 42' thus allowing the outer side of each scavenging passage 43' to be exposed to the outer atmosphere. Accordingly, a pair of scavenging passage covers 45', 45' each having a smoothly curved inner surface in conformity with the scavenging passage 43' and prepared separately from the cylinder portion 2', are to be attached to the openings-for-casting 44', 44' respectively, so as to close the openings-for-casting 44', thereby forming smoothly curved complete passages of the scavenging passage 43'.

The crank chamber 6' is formed of a short cylindrical shape and hermetically closed. A crank shaft 30' is axially held at a central portion of each of the right and left sides of the crank chamber 6'. The piston 4' is connected via a connecting rod 32' to a crank pin 31' of the crank shaft 30'. A pair of sector-shaped crank webs 34', 34' are fixed at the right and left ends of the crank pin 31' so that the connecting rod 32' is interposed between the pair of sector-shaped crank webs 34', 34'. Thus, these crank webs 34', 34' are adapted to be rotated integrally with the crank shaft 30'.

For the purposes of obtaining a predetermined rated horsepower, feeding a required quantity of air-fuel mixture into the combustion chamber 3', and effectively discharging combustion exhaust gas, the two-cycle internal combustion engine 1' is designed as shown in FIG. 3B. Namely, the positional relationships between the scavenging ports 42', 42' and the exhaust port 40', i.e. the positions, shapes and sizes of the scavenging ports 42', 42' and the exhaust port 40', are designed such that the openings of the ports 42', 42' and 40' would be simultaneously overlapped with each other as shown in FIG. 3B. Namely, the lateral lower edges of the exhaust port 40' are contacted with a portion of the bore surface of the combustion chamber 3', which is located at an angle of 53° as measured rightward and leftward from the center 0' of the combustion chamber 3', starting from the central longitudinal sectional line F' dividing the exhaust port 40' into two halves. Thus, the exhaust port 40' is opened to such an extent that the lateral width thereof corresponds to a central angle of 106°. On the other hand, the location of each scavenging port 42' is formed such that it is shifted by an angle of 16° from the lateral edge of the exhaust port 40', and the lateral width of each scavenging port 42' corresponds to an angle of 64° as measured from the center 0' of the combustion chamber 3'.

With an increasing concern of environmental problems in recent years and the trend to further strengthen environmental regulations, a reduction not only of the toxic substances in the exhaust gas but also the decreased engine noise is strongly demanded even in a small two-cycle internal combustion engine which is adapted to be employed in a portable working machine.

In particular, there are problems inherent to a two-cycle internal combustion engine, i.e. problems of how to minimize the noise and vibration resulting from the high speed revolution of the engine, of how to reduce the quantity of HC in the exhaust gas which is brought about due to a phenomenon of blow-by of unburnt air-fuel mixture from the combustion chamber, or of how to prevent the discharge of the unburnt air-fuel mixture which is brought about due to a phenomenon of spitting of fuel toward the air-cleaner. The solution of these problems are now strongly demanded.

Reductions in the weight and manufacturing cost of small two-cycle internal combustion engines are also problems that should be solved. In an attempt to solve these problems, the conventional two-cycle internal combustion engine is generally designed to be operated at a high revolution speed of 8,000/min. or more, in order to make it possible to output a predetermined required horsepower with an internal combustion engine of as small an engine displacement as possible. This high revolution speed may be contrasted with a four-cycle internal combustion engine, which is generally operated at a revolution speed of at most 4,000/min. Namely, due to such a high revolution speed in the operation of a small two-cycle internal combustion engine, the noise and vibration become inevitably large.

Generally, the magnitudes of engine noise and vibration are proportional to the revolution speed of the engine, i.e. the larger the engine revolutions, the larger the magnitudes of engine noise and vibration. Therefore, if the revolutions of a small two-cycle internal combustion engine is made smaller, the magnitudes of engine noise and vibration can be made smaller. However, if the engine revolutions is lowered, the output of the engine is also lowered, so that it would become impossible to obtain a required horsepower.

It may be possible to obtain a required output or horsepower while reducing the engine revolutions, provided that an internal combustion engine of large enough displacement is employed and operated with reduced engine revolutions. However, when the displacement of an internal combustion engine is increased, the entire structure of the internal combustion engine becomes inevitably larger and, at the same time, the gross weight of the engine becomes heavier since parts of higher strength are required to be employed in conformity with an increased output to be obtained. Therefore, if such a heavy engine is mounted on a portable working machine, the ease of manipulability of the working machine deteriorates, and the manufacturing cost is increased. Moreover, since the internal combustion engine is forced to be operated at a low revolution speed without being able to output its inherent potential horsepower, the engine cannot be operated effectively. There is also a danger that the working machine may be unintentionally operated with an excessive output over a predetermined magnitude.

SUMMARY OF THE INVENTION

The present invention has been made under the circumstances mentioned above, and therefore an object of the present invention is to provide a two-cycle internal combustion engine which has a low revolution speed even if operated under a normal load, and which has minimal engine noise and vibration.

According to the present invention, there is provided a two-cycle internal combustion engine including a combustion chamber, an exhaust port opening into the combustion chamber and a scavenging port opening into the combustion chamber, wherein the combustion chamber is made relatively large in capacity and an opening area of an exhaust port and a scavenging port is made as small as possible so as to restrict the revolutions of the crank shaft during a rated output operation of the engine.

According to a preferable embodiment of the present invention, the exhaust port opens into the combustion chamber in such a manner that the width in the lateral direction of the opening of the exhaust port corresponds to an angle of 60°, as measured from the center of the combustion chamber, and the scavenging port opens into the combustion chamber in such a manner that the width in the lateral direction of the opening of the scavenging port corresponds to an angle of 32°, as measured from the center of the combustion chamber. According to another preferable embodiment of the present invention, the internal combustion engine is provided with a fuel injection nozzle which is designed to directly inject the fuel into the combustion chamber.

In the two-cycle internal combustion engine constructed according to the present invention, the ratio in size of the opening area of each of the exhaust port and the scavenging port in relation to the total displacement is made relatively small as compared with that of the conventional two-cycle internal combustion engine. Namely, it is a feature of the two-cycle internal combustion engine according to the present invention that the ratio in size of the opening area of each of the exhaust port and the scavenging port in relation to the total displacement is made as small as possible as compared with that of the conventional two-cycle internal combustion engine, thereby greatly restricting the quantity of air/gas to be scavenged or discharged in each single cycle of the engine, thus making it impossible to perform a high speed operation of the engine and hence minimizing the output of horsepower.

It is possible in the case of a reciprocating type internal combustion engine to reduce the noise and vibration of the engine by reducing the revolutions of the crank shaft. However, when the revolutions of the crank shaft is reduced in this manner, the horsepower of the internal combustion engine is also proportionally reduced, thereby making it impossible to obtain a required horsepower from the engine. Accordingly, it is imperative to enlarge the total displacement, if it is desired to reduce the revolutions of the engine while maintaining a required horsepower output.

If the pressure of the scavenging air to be supplied from the crank chamber of a crank chamber pre-compression system two-cycle internal combustion engine is assumed to be the same, the weight of air to be supplied to the combustion chamber at the moment of scavenging is proportional to the opening area of the scavenging port, so that if the opening area of the scavenging port is smaller, the weight of air to be supplied to the combustion chamber becomes smaller. Additionally, if the weight of air to be supplied to the combustion chamber becomes smaller, the output of the internal combustion engine would be reduced, and hence the revolutions of the engine would not be increased.

Since the opening area of the exhaust port and scavenging port is made as small as possible in the two-cycle internal combustion engine of the invention as compared with the conventional internal combustion engine of the same total displacement, the engine can be operated at a decreased revolutions even at the moment of full load operation, thereby making it possible to minimize the noise and vibration of the engine.

Since the two-cycle internal combustion engine according to the present invention may be the same in terms of the rated horsepower output as that of the conventional two-cycle internal combustion engine, the only portion that is required to be enlarged in the engine is the cylinder. Thus, the crank shaft and crankcase may be of the same size as those of the conventional internal combustion engine of same output horsepower.

Furthermore, since a fuel injection nozzle is mounted on the two-cycle internal combustion engine according to the preferable embodiment, a sufficient quantity of fuel to meet the quantity of intake air can be injected even if the quantity of intake air is restricted due to the reduced opening area of both the exhaust port and the scavenging port, thereby making it possible to achieve an excellent combustion and to accurately and easily control the air/fuel ratio of the engine in a lean burn.

BRIEF DESCRIPTION OF THE DRAWINGS

FIG. 2A is a longitudinal sectional view illustrating one embodiment of a two-cycle internal combustion engine according to the present invention;

FIG. 2B is a longitudinal sectional view illustrating a two-cycle internal combustion engine according to the prior art;

FIGS. 3A and 3C are horizontal sectional views taken along the line III—III of FIG. 1 illustrating one embodiment of the present invention;

FIGS. 3B and 3D are horizontal sectional views taken along the line III'—III' of FIG. 4 illustrating the prior art.

DETAILED DESCRIPTION OF THE INVENTION

The present invention will be further explained with reference to the drawings depicting one embodiment of a two-cycle internal combustion engine according to the present invention.

Figure 1:
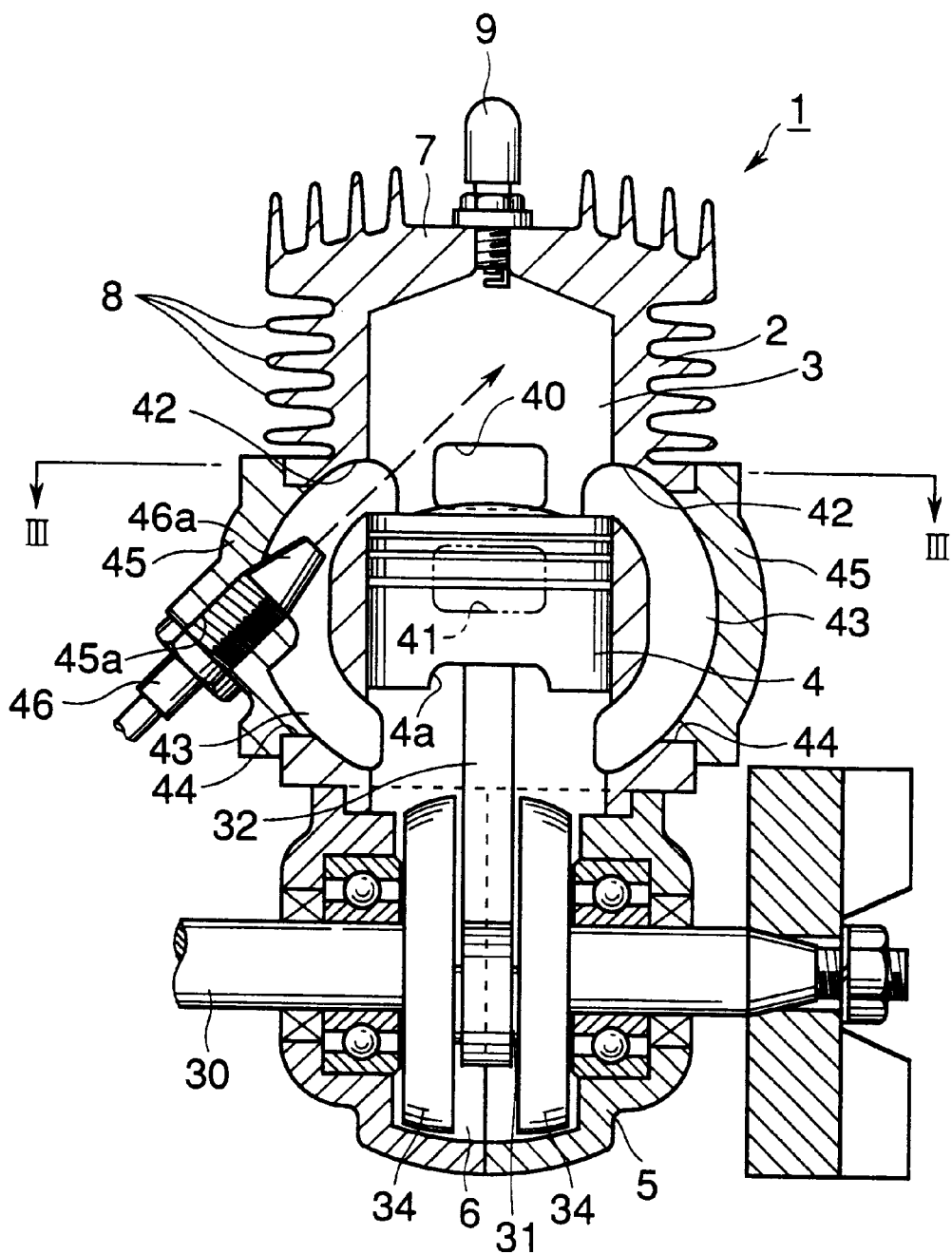
FIG. 1 is a longitudinal sectional view illustrating one embodiment of a two-cycle internal combustion engine according to the present invention.
Figure 4:
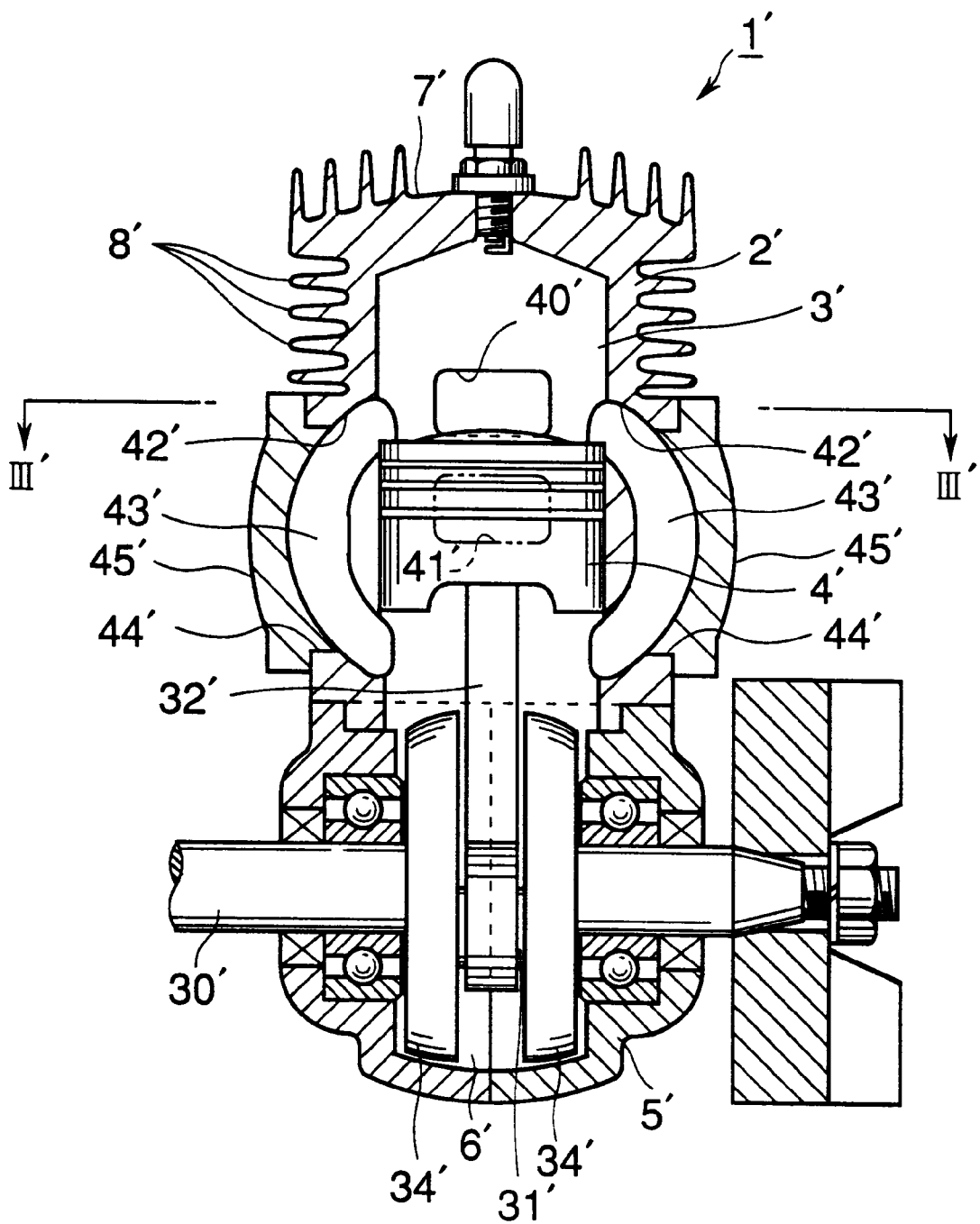
FIG. 4 is a longitudinal sectional view illustrating a two-cycle internal combustion engine according to the prior art.

FIG. 1 is a longitudinal sectional view of a fuel injection type two-cycle internal combustion engine 1 (hereinafter referred to simply as an internal combustion engine) according to this embodiment. This internal combustion engine 1 (for example, the two-cycle internal combustion engine 1 according to an embodiment shown in FIGS. 1, 2A and 3A has a total displacement: 39.7 cc; a cylinder bore: 38 mm; and a piston stroke: 35 mm) is formed of a two-cycle internal combustion engine of the so-called Schnuerle type crank chamber pre-compression system and includes a cylinder block 2 having a combustion chamber 3 in which a piston 4 is adapted to be slidingly moved up and down, a split type crankcase 5 attached to the lower end portion of the cylinder block 2 and provided therein with a crank chamber 6, a cylinder head 7 which is formed integral with the upper portion of the cylinder block 2, a plurality of cooling fins 8 for air-cooling which are formed on the outer periphery of the cylinder block 2 and the cylinder head 7, and a spark plug 9 attached to a suitable portion of the cylinder head 7 and connected to an electron The crank device (not shown).

The crank chamber 6 is cylindrical in shape, short in length and hermetically closed. A crank shaft 30 is axially held at a central portion of each of the right and left sides of the crank chamber 6. The piston 4 is connected via a connecting rod 32 to a crank pin 31 of the crank shaft 30. A pair of sector-shaped crank webs 34, 34 are fixed at the right and left ends of the crank pin 31, so that the connecting rod 32 is interposed between the pair of sector-shaped crank webs 34, 34. Therefore, the crank webs 34, 34 are designed to be rotated integrally with the crank shaft 30.

The cylinder block 2 is provided with an exhaust port 40 which opens at a portion of the inner wall of the combustion chamber 3 that is directed to intersect at a right angle with the axis of the crank shaft 30. The cylinder block 2 is also provided with a suction port 41 which opens at a portion of the inner wall of the combustion chamber 3 which approximately faces the exhaust port 40 (a portion which is dislocated by an angle of 180°) but is located at somewhat lower level than where the exhaust port 40 is located. Furthermore, a pair of scavenging ports 42, 42 are formed in the cylinder block 2 in such a manner that the openings thereof are formed at portions of the inner wall of the cylinder block 2 that are located at an intermediate portion between the exhaust port 40 and the suction port 41, i.e. each set apart by an angle of 90° from the exhaust port 40 and the suction port 41 (right and left sides in FIG. 1) so as to face each other and so that the locations of the openings thereof are displaced downward from the location of the exhaust port 40 to such an extent that the openings would not be opened to the combustion chamber 3 concurrently with the exhaust port 40 during the operation of engine (i.e. the openings of the exhaust port 40 and the suction port 41 do not overlap with the opening of the scavenging ports 42, 42 during the operation of engine). These scavenging ports 42, 42 are formed respectively on the top of each of the so-called wall type scavenging passages 43, 43 each of which extends from the scavenging ports 42, 42 toward the lower portion of the cylinder block 2 so as to communicate with the crank chamber 6.

In order to facilitate the monoblock casting of the cylinder block 2 and the cylinder head 7 by means of a high pressure die casting, a pair of openings—for-casting 44, 44 are formed respectively along the scavenging passages 43, 43 thus allowing the outer side of each scavenging passage 43 to be communicated with the outer atmosphere. Accordingly, a pair of scavenging passage covers 45, 45 each having a smoothly curved inner surface in conformity with the scavenging passage 43 and prepared separately from the cylinder block 2, are attached to the openings-for-casting 44, respectively. When the scavenging passage covers 45, 45 are attached to the openings-for-casting 44, 44 respectively, the openings-for-casting 44, 44 are closed, thereby completing smoothly curved passages so as to allow scavenging air to pass therethrough, thus exhibiting an efficient scavenging.

The cylinder block 2 can be formed integrally with the portions of the scavenging passage covers 45, 45 by employing a dissipating core in the molding of the cylinder block 2.

One (one on the left side in FIG. 1) of the scavenging passage covers 45, 45 is provided with an internally threaded through-hole 45a, in which a fuel injection nozzle 46 (a bubble jet system fuel injection nozzle, for instance) having an external thread on its outer peripheral wall is inserted or screwed. The distal end 46a of the fuel injection nozzle 46 is directed toward the top of the combustion chamber 3, so that, when a fuel is injected, the injected fuel is fed to a region inside the combustion chamber 3 which is optimum for the combustion of the fuel.

FIGS. 2A and 2B illustrate respectively a longitudinal sectional view wherein the internal combustion engine 1 according to the foregoing embodiment and the internal combustion engine 1 according to the prior art, both being represented on an equivalent scale, are compared with each other. As far as the members disposed on the crankcases 5, 5' sides are concerned, both engines 1, 1' are the same in size with each other. However, with respect to the members disposed on the cylinder blocks 2, 2' sides, both engines are not identical in size with each other. Namely, in the case of the internal combustion engine 1 according to this embodiment, the dimension of the cylinder block 2 only is made larger than that of the internal combustion engine 1' of the prior art, in contrast to the crankcase 5 which is substantially the same with the crankcase 5' of the prior art.

FIG. 3A shows a horizontal sectional view taken along the line III—III of FIG. 1 illustrating the internal combustion engine 1 according to this embodiment, wherein the dimensions of the exhaust port 40 and the scavenging ports 42, 42 are compared. Namely, the lateral inner edges of the exhaust port 40 are contacted with a portion of the bore surface of the combustion chamber 3, which is located at an angle of 30° as measured rightward and leftward from the center 0 of the combustion chamber 3 and starting from the central longitudinal sectional line F dividing the exhaust port 40 into two halves. Thus, the exhaust port 40 is opened to such an extent that the lateral width thereof corresponds to a central angle of 60°. On the other hand, the location of scavenging ports 42, 42 is formed such that they are shifted by an angle of 55° from the inner edge of the exhaust port 40 and the lateral width of the scavenging ports 42, 42 corresponds to an angle of 32° as measured from the center 0 of the combustion chamber 3.

The indicated horsepower I.P.S of the internal combustion engine of this type can be represented by the following formula (1).

$$\text{I.P.S.} = Pmi \times L \times A \times N \times Z \times K/(60 \times 75) \quad (1)$$

wherein Pmi is an indicated mean pressure; L is the piston stroke; A is the cross-sectional area of cylinder; N is the revolutions; z is the number of cylinders; and K is a constant.

As may be seen from the formula (1), if the revolutions N of the internal combustion engine is made smaller, the magnitude of noise and vibration, respectively, of the engine can be decreased. However, if the number of revolutions of the engine is lowered, the output of the engine is also lowered, so that it would become impossible to obtain a required output horsepower from the engine. Accordingly, it is imperative to enlarge the total displacement (L ×A), if it is desired to reduce the engine revolutions while maintaining the same output in horsepower.

In order to keep the revolutions (N) to a low level even in the normal load operation of the internal combustion engine, the width as well as the height of opening of each of the exhaust port 40 and the scavenging ports 42, 42 are made smaller as shown in FIG. 3(A), so that the area of opening in each port 40 or 42 is greatly reduced as compared with that of the conventional internal combustion engine 1' having the same level of output horsepower.

If the pressure of scavenging air to be supplied from the crank chamber 6 is assumed to be the same, the weight of air to be supplied to the combustion chamber 3 at the moment of scavenging is proportional to the opening area of the scavenging ports 42, 42. Thus if the opening area of the scavenging ports 42, 42 is smaller, the weight of air to be supplied to the combustion chamber 3 becomes smaller. Additionally, if the weight of air to be supplied to the combustion chamber 3 becomes smaller, the output of the internal combustion engine 1 would be reduced and hence the revolutions of the engine would not be increased.

The ratio of the opening areas of the exhaust port 40 and the scavenging ports 42, 42 to the total displacement in the internal combustion engine 1 of this embodiment is made much smaller than is conventional, as clearly seen from a comparison of FIG. 3A with FIG. 3B. Namely, in the two-cycle internal combustion engine 1 according to the present invention (FIG. 3A), the ratio in size of the opening area of each exhaust port and each scavenging port in relation to a total displacement is made as small as possible as compared with that of the conventional two-cycle internal combustion engine 1' (FIG. 3B), thereby greatly restricting the quantity of air/gas to be scavenged or discharged in every single cycle of the engine 1 and thus intentionally minimizing the output horsepower.

In the case of the internal combustion engine 1 where a total displacement is 39.7 cc, a cylinder bore is 38 mm, and a piston stroke is 35 mm, which represents one embodiment of the present invention, the opening area of each of the exhaust port 40 and the scavenging ports 42, 42 is made smaller by about 50% as compared with those of the conventional internal combustion engine 1' of the same total displacement as mentioned above. As a result, the conventional internal combustion engine having a rated output of 2.4 KW and an engine revolution speed of about 8,000 rpm can be turned into the internal combustion engine 1 which has a rated output of 1.0 KW and an engine speed of about 4,000 rpm.

Next, the operation of the internal combustion engine 1 according to the embodiment constructed as explained above will be explained as follows.

The internal combustion engine 1 according to this embodiment is the so-called piston valve system type, wherein neither a suction valve nor an exhaust valve is provided, and the suction port 41, the scavenging ports 42, 42 or the exhaust port 40 are alternatively allowed to communicate respectively with the crank chamber 6 and with the combustion chamber 3 by the reciprocating movement (up and down movement) of the piston 4, thereby performing the suction, scavenging or exhausting of the engine in the same manner as the suction valve, scavenging valve or exhaust valve.

In the operating condition of the internal combustion engine 1 where the piston 4 is moved up and down, when the piston 4 is moved down to come close to the bottom dead center, the exhaust port 40 is opened at first, thereby allowing the combustion exhaust gas to be discharged from the interior of the combustion chamber 3 to the outside of the engine 1. Then, the scavenging ports 42, 42 are opened so as to allow the air sucked and pre-compressed in the crank chamber 6 to be introduced via the scavenging passages 43, 43 into the combustion chamber 3, thereby purging any residual combustion exhaust gas out of the combustion chamber 3 through the exhaust port 40, thus scavenging the combustion chamber 3. On this occasion, a little amount of the sucked air is also discharged through the exhaust port 40.

During this scavenging operation, the piston 4 starts to move upward to again close the scavenging ports 42, 42. However, at a suitable timing immediately before the scavenging ports 42, 42 are closed, the fuel is injected directly into the combustion chamber 3 from the fuel injection nozzle 46 and mixed with the air sucked in the combustion chamber 3.

After the injection of the fuel, the piston 4 is further moved upward to close the scavenging ports 42, 42 at first and then to enter into the compression stroke while closing the exhaust port 40. When the piston 4 is further advanced to reach near the top dead center, the spark plug 9 is fired, thereby igniting and explosively burning the air-fuel mixture.

When the piston 4 enters the compression stroke, the pressure in the crank chamber 6 is gradually decreased with the ascending movement of the piston 4, so that when the skirt portion 4a of the piston 4 is moved up past the lower edge portion of the suction port 41, thus allowing the suction port 41 to be communicated with the crank chamber 6, the ambient air is simultaneously sucked into the crank chamber 6 through an air cleaner (not shown).

In the expansion stoke following the explosion of the air-fuel mixture, when the piston 4 is moved downward to close the suction port 41, the air that has been sucked in the crank chamber 6 is pre-compressed. At the same time, the scavenging ports 42, 42 are opened, thus allowing the crank chamber 6 to communicate with the combustion chamber 3. As a result, the air that has been sucked and pre-compressed in the crank chamber 6 is forced to enter via the scavenging passages 43, 43 into the combustion chamber 3 from the scavenging ports 42, 42 in readiness to repeat the sequence of the strokes as described above.

The fuel injection nozzle 46 can be controlled such that it is not only capable of injecting fuel every time the internal combustion engine 1 enters into a scavenging stroke, by every rotation of the crank shaft 30 of the internal combustion engine 1, but also capable of performing a thinned-out injection, i.e. one fuel injection per every second revolution of the crank shaft 30, one fuel injection per every third revolution of the crank shaft 30, one cessation of fuel injection per every third revolution of crank shaft 30, and so on.

Since the opening area of each of the exhaust port 40 and the scavenging ports 42, 42 is made as small as possible in the two-cycle internal combustion engine 1 according to this embodiment as compared with the conventional internal combustion engine 1' of the same total displacement, the engine 1 can be operated with a decreased revolutions even at the moment of full load operation, thereby making it possible to minimize the noise and vibration of the engine 1.

Since the opening area of each of the exhaust port 40 and the scavenging ports 42, 42 is made smaller in the two-cycle internal combustion engine 1 according to this embodiment, the rated horsepower to be attained thereby may be decreased as compared with that of the conventional internal combustion engine 1' of the same total displacement. Therefore, if an internal combustion engine of the same rated horsepower is to be obtained, the total displacement of the internal combustion engine is required to be enlarged, i.e. the volume of the combustion chamber of the internal combustion engine is required to be sufficiently enlarged. However, since the rated horsepower of the engine is not required to be increased as compared with the conventional internal combustion engine of small displacement, only the cylinder portion of the internal combustion engine is required to be slightly enlarged in diameter and in height. Namely, little trouble would be caused in terms of mechanical strength even if the crankcase portion of the internal combustion engine is kept to the same as that of the conventional internal combustion engine of the same displacement. Therefore, the internal combustion engine of this embodiment can be manufactured without appreciably increasing the outer dimension and weight of the engine as a whole.

Since the two-cycle internal combustion engine 1 according to this embodiment is provided with the fuel injection nozzle 46, and an atomized fuel is fed to the combustion chamber 3 directly from the fuel injection nozzle 46, thereby allowing the fuel to be mixed with the sucked air for the first time in the combustion chamber 3, a suitable quantity of fuel meeting any quantity of the sucked air can be injected from the fuel injection nozzle 46, even if the quantity of the intake air is restricted due to the small openings of the exhaust port 40 and scavenging ports 42, 42. As a result, it is possible to achieve the combustion of fuel and at the same time, the air/fuel ratio of engine, in the lean burn for instance, can be accurately and easily controlled.

In the foregoing explanation, the present invention has been explained with reference to a preferred embodiment. It will be understood, however, that the invention is not limited to this embodiment, but may be variously modified within the spirit and scope of the invention as set forth in the claims.

As explained above, since the opening area of each of the exhaust port and the scavenging port is made as small as possible in the two-cycle internal combustion engine according to the present invention, it is possible to decrease the revolutions of the engine and to minimize the noise and vibration of the engine.

Even if the quantity of the intake air is restricted due to the small openings of the exhaust port and scavenging port, it is possible to inject a suitable quantity of fuel to meet such a reduced quantity of air by the action of the fuel injection nozzle which is adapted to inject the fuel directly into the combustion chamber, thereby enabling an excellent combustion of fuel to be achieved.

I claim:

1. A two-cycle internal combustion engine, comprising:
    a combustion chamber;
    an exhaust port opening into said combustion chamber; and
    a scavenging port opening into said combustion chamber, said combustion chamber being made relatively large in capacity and the opening area of each of said exhaust port and said scavenging port being made as small as possible so as to restrict the engine revolutions during a rated output operation of said engine
    wherein said exhaust port opens into said combustion chamber in such a manner that the width of the inner opening of said exhaust port in a lateral direction corresponds to an angle of 60° as measured from a center point of the combustion chamber;
    and said scavenging port opens into said combustion chamber in such a manner that the width of the inner opening of said scavenging port in a lateral direction corresponds to an angle of 32° as measured from a center point of the combustion chamber.

2. The two-cycle internal combustion engine according to claim 1, wherein said internal combustion engine is provided with a fuel injection nozzle which is designed to directly inject the fuel into said combustion chamber.

* * * * *